United States Patent
Mori et al.

(10) Patent No.: US 10,883,449 B2
(45) Date of Patent: Jan. 5, 2021

(54) JET SYSTEM

(71) Applicant: Japan Aerospace Exploration Agency, Tokyo (JP)

(72) Inventors: Osamu Mori, Sagamihara (JP); Junichiro Kawaguchi, Sagamihara (JP); Toshihiro Chujo, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 227 days.

(21) Appl. No.: 15/466,123

(22) Filed: Mar. 22, 2017

(65) Prior Publication Data
US 2017/0276093 A1  Sep. 28, 2017

(30) Foreign Application Priority Data

Mar. 23, 2016  (JP) .................................. 2016-059058
Mar. 22, 2017  (JP) .................................. 2017-056053

(51) Int. Cl.
*F02K 9/56* (2006.01)
*F02K 9/58* (2006.01)
*F02K 9/44* (2006.01)

(52) U.S. Cl.
CPC .............. *F02K 9/56* (2013.01); *F02K 9/44* (2013.01); *F02K 9/58* (2013.01)

(58) Field of Classification Search
CPC ..... F02K 9/50; F02K 9/58; F02K 9/44; B64G 1/406; F03H 1/0012
See application file for complete search history.

(56) References Cited

U.S. PATENT DOCUMENTS

| | | | |
|---|---|---|---|
| 5,640,844 A * | 6/1997 | Pahl .......................... | F02K 9/50 60/259 |
| 5,880,356 A | 3/1999 | Delepierre-Massue et al. | |
| 2004/0148925 A1 * | 8/2004 | Knight ...................... | F02K 9/50 60/259 |

(Continued)

FOREIGN PATENT DOCUMENTS

| JP | H11-500803 A | 1/1999 |
|---|---|---|
| JP | 2015-214956 A | 12/2015 |

OTHER PUBLICATIONS

Gaiuque "The Entropies of Nitrogen Tetroxide and Nitrogen Dioxide." 1938 (Year: 1938).*

(Continued)

*Primary Examiner* — Scott J Walthour
*Assistant Examiner* — William L Breazeal
(74) *Attorney, Agent, or Firm* — Studebaker & Brackett PC

(57) ABSTRACT

Provided is a jet system capable of regulating a pressure of a jet substance without using any high-pressure gas supply subsystem. In a storage section for storing therein a jet substance such as fuel or oxidizer, a pressurizing substance such as liquefied gas is stored in addition to the jet substance, to enable the jet substance to be supplied from the storage section according to pressurization from the pressurizing substance. A jet operation is performed while an internal pressure of the storage section lowered along with discharge of the jet substance therefrom is at least partially recovered by at least a part of the pressurizing substance vaporized in the storage section.

10 Claims, 12 Drawing Sheets

(56) References Cited

U.S. PATENT DOCUMENTS

2013/0196273 A1* 8/2013 Mungas .............. F02K 9/50
431/11
2017/0073089 A1* 3/2017 Kawaguchi .......... F02K 9/605

OTHER PUBLICATIONS

Wikipedia Ammonia (data page) 2019 (Year: 2019).*
The Artemis Project "All About Hydrazine" 2019 (Year: 2019).*
Engineering Toolbox "Butane-Specific Heat" (Year: 2019).*
ESDU "Thermophysical Properties of Nitrous Oxide" (Year: 2006).*
T. J. Barber et al.; "Initial Galileo Propulsion System In-Flight Characterization"; AIAA/SAE/ASME/ASEE 29th Joint Propulsion Conference and Exhibit; Jun. 28-30, 1993; pp. 1-25; AIAA 93-2117; American Institute of Aeronautics and Astronautics; Monterey, CA, USA.
Makoto Yoshikawa; "Additional measures for chemical propulsion system of 'Hayabusa 2'" [online]; Hayabusa 2 Project Team, Lunar and Planetary Exploration Program Group (JSPEC), Japan Aerospace Exploration Agency; Nov. 22, 2011.
Bruce E. Poling et al.; "TABLE 2-284 Thermodynamic Properties of R-218, Octafluoropropane"; Perry's Chemical Engineers' Handbook 8th Edition Section 2: Physical and Chemical Data; 2007.
Toshihiro Chujo et al.; "Development of Gas-Liquid Equilibrium Pressure Regulator System Aimed at Small Satellites"; JSASS-2015-4243; pp. 1-4; Oct. 7-9, 2015, Japan.

* cited by examiner

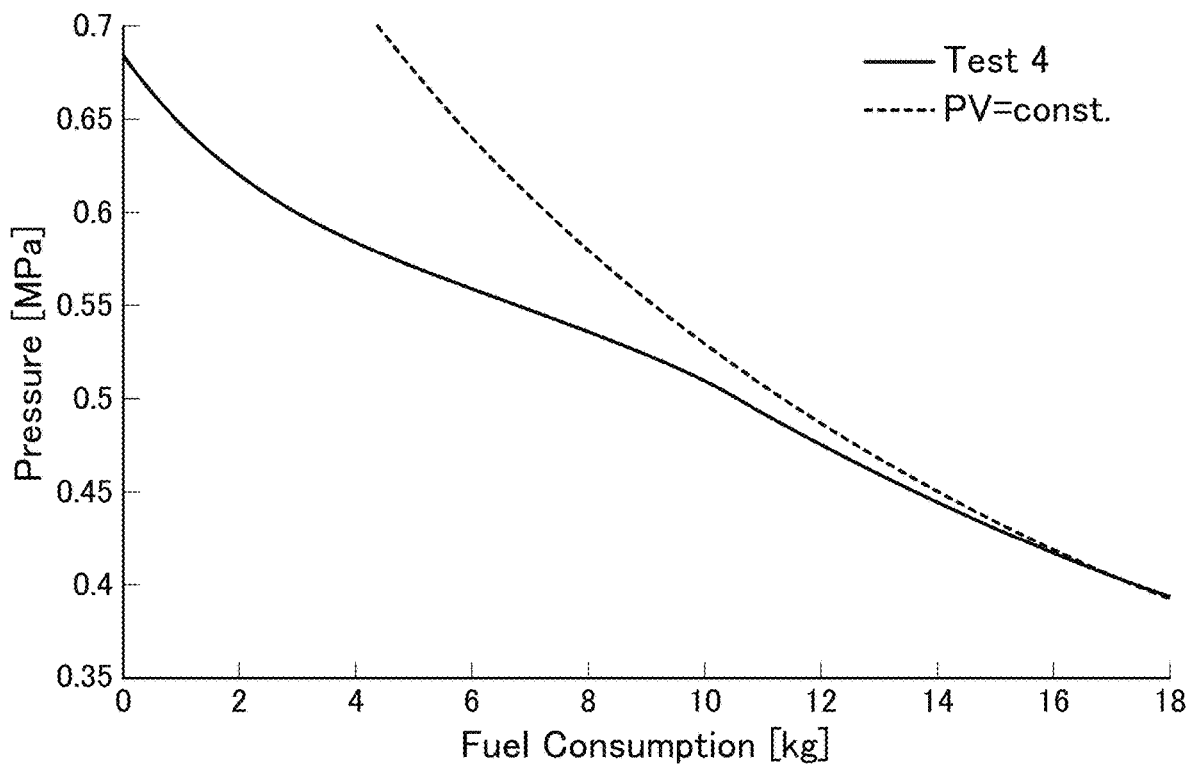
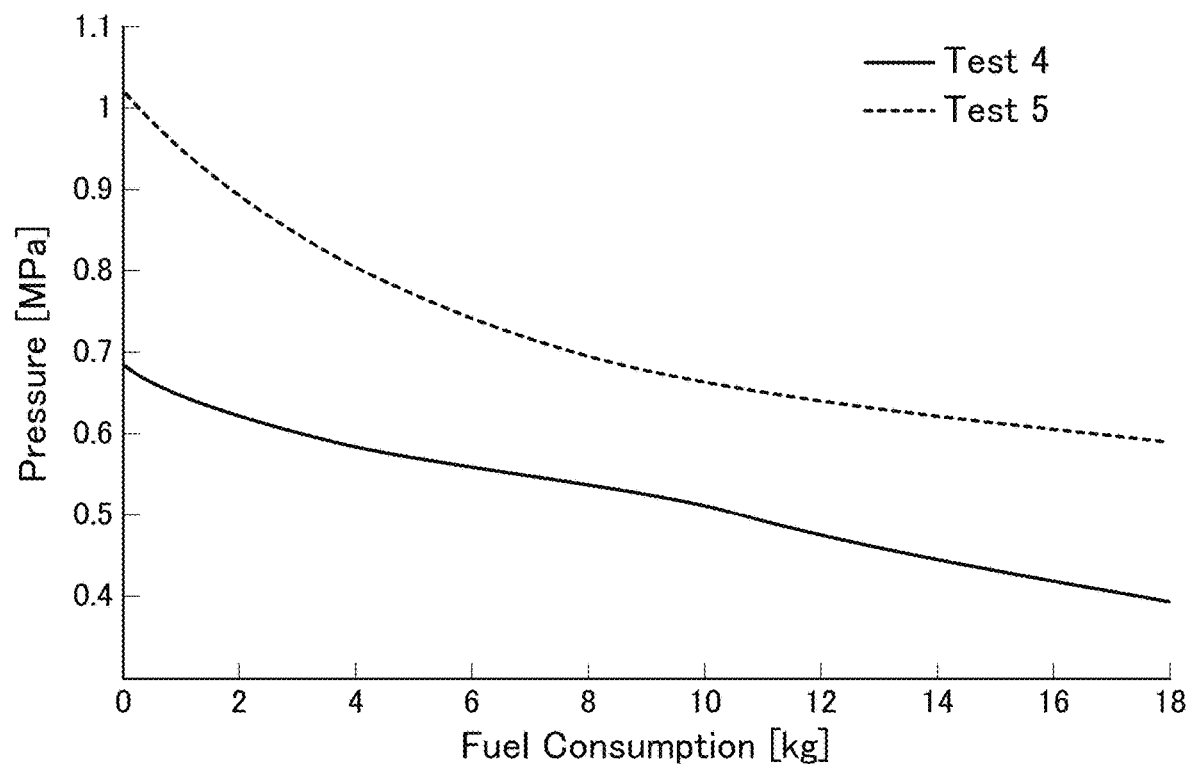

JET SYSTEM

TECHNICAL FIELD

The present invention relates to a jet system. In particular, the present invention relates to a jet system using a vapor-liquid equilibrium pressure regulation scheme and employable in a single-liquid (monopropellant), two-liquid (bipropellant) or three or more-liquid (tri- or more propellant) fueled propulsion system.

BACKGROUND ART

As a propulsion system using liquid fuel, there have been known a single-liquid propulsion system and a two-liquid propulsion system (see the following Patent Documents 1 and 2 and Non-Patent Documents 1 to 3). Examples of a heretofore-known single-liquid propulsion system include a system using hydrazine ($N_2H_4$) as liquid fuel, wherein the liquid fuel is brought into contact with an indium-containing catalyst to thereby generate a high-temperature jet gas flow to obtain thrust (propulsive force), and a system using hydrogen peroxide as liquid fuel. Examples of a heretofore-known two-liquid propulsion system (blowdown type, pressure regulation type) include a system using hydrazine as liquid fuel and dinitrogen tetraoxide as oxidant or oxidizer, wherein the liquid fuel and the oxidizer are mixed together and combusted to generate a jet gas flow, and a system using liquid hydrogen as fuel and liquid oxygen as oxidizer.

In the two-liquid propulsion system, there are some cases where a pressure regulation mechanism based on high-pressure gas is provided to obtain enhanced performance (pressure regulation type; see, for example, an aftermentioned example depicted in FIG. 2B). The pressure regulation type of propulsion system employs a pressure regulation mechanism configured such that high-pressure inert gas stored in a high-pressure gas supply tank is supplied to a liquid fuel tank and an oxidizer tank via a regulator to thereby regulate respective internal pressures of the two tanks. However, this type of propulsion system is essentially required to comprise a high-pressure gas supply subsystem including the high-pressure gas supply tank, so that there are problems such as a risk of gas or liquid leakage and an increase in mass of the entire system.

Moreover, when pressures of the two liquids (liquid fuel and oxidizer) are regulated using a common high-pressure gas supply subsystem (common high-pressure gas supply line) as in an example depicted in FIG. 2B, there is a possibility that the two liquids flow back toward the high-pressure gas supply tank, thereby leading to mixing therebetween and development of an unexpected reaction. In the Venus orbiter "Akatsuki" and the Mars probe "Mars Observer", pressures of the two liquids were regulated by a common high-pressure gas supply subsystem.

On the other hand, in a two-liquid protrusion system of the asteroid probe "Hayabusa 2", the two-liquid pressure regulation mechanism is fully separated into two sub-mechanisms to prevent mixing of the two liquids. However, this configuration undesirably led to a further increase in mass of the entire system and a higher risk of leakage. Moreover, pressures of the two liquids are regulated separately, so that there is also a possibility that the pressures become imbalanced, thereby causing an abnormal jet.

CITATION LIST

Patent Document

Patent Document 1: JP 11-500803 A
Patent Document 2: JP 2015-214956 A

Non-Patent Document

Non-Patent Document 1: Initial Galileo Propulsion System in-Flight Characterization, AIAA/SAE/ASME/ASEE 29th Joint Propulsion Conference and Exhibit, AIAA93-2117, Monterey, Jun. 28-30, 1993
Non-Patent Document 2: Makoto YOSHIKAWA, "Additional measures for chemical propulsion system of "Hayabusa 2""[online], Nov. 22, 2011, Hayabusa 2 Project Team, Lunar and Planetary Exploration Program Group (JSPEC), Japan Aerospace Exploration Agency [Search: Jan. 28, 2016], Internet <URL:http://www.mext.go.jp/b_menu/shingi/uchuu/016/002/gijiroku/_icsFiles/afieldfile/2011/12/02/1313456_01.pdf>
Non-Patent Document 3: Bruce E. Poling., George H., Thomson., Daniel G Friend., Richard L. Rowley., W. Vincent Wilding: Perry's Chemical Engineers' Handbook 8th Edition Section 2: Physical and Chemical Data, Page 2-384, 2007.

SUMMARY OF INVENTION

Technical Problem

In view of the above circumstances, the present invention addresses a technical problem of providing a jet system capable of regulating a pressure of a jet substance without using any high-pressure gas supply subsystem.

Solution to Technical Problem

In order to solve the above technical problem, according to a first aspect of the present invention, there is provided a jet system comprising: a storage section for storing therein a jet substance and a pressurizing substance; a jet flow creation section for creating a jet flow using the jet substance stored in the storage section; and a jet port for jetting a jet flow created by the jet flow creation section, wherein the pressurizing substance is capable of being at least partially vaporized in the storage section to thereby pressurize an inside of the storage section.

Preferably, the jet system of the present invention further comprises a separation member provided inside the storage section and capable of separating the jut substance and the pressurizing substance from each other, and transmitting a pressure of the pressurizing substance to the jet substance therethrough.

More preferably, the jet substance has a heat capacity greater than a heat capacity of the pressurizing substance.

Preferably, in the jet system of the present invention, the storage section stores therein a second pressurizing substance for pressurizing the inside of the storage section.

Preferably, the jet system of the present invention further comprises a temperature control section for controlling an internal temperature of the storage section to cause the pressurizing substance to be vaporized.

In order to solve the above technical problem, according to a second aspect of the present invention, there is provided a jet system comprising: a first storage section storing therein a first jet substance and a first pressurizing substance;

a second storage section storing therein a second jet substance and a second pressurizing substance; a jet flow creation section for creating a jet flow using the first jet substance stored in the first storage section and the second jet substance stored in the second storage section; and a jet port for jetting a jet flow created by the jet flow creation section, wherein each of the first and second pressurizing substances is capable of being at least partially vaporized in a corresponding one of the first and second storage sections to thereby pressurize an inside of the corresponding one of the first and second storage sections.

Preferably, in the jet system of the present invention, the first jet substance is a fuel, and the second jet substance is an oxidizer, wherein the jet flow creation section is configured to mix the fuel and the oxidizer together to thereby combust the fuel to create the jet flow.

Preferably, the jet system of the present invention further comprises: a first separation member provided inside the first storage section and capable of separating the first jut substance and the first pressurizing substance from each other, and transmitting a pressure of the first pressurizing substance to the first jet substance therethrough; and a second separation member provided inside the second storage section and capable of separating the second jut substance and the second pressurizing substance from each other, and transmitting a pressure of the second pressurizing substance to the second jet substance therethrough.

More preferably, the first jet substance has a heat capacity greater than a heat capacity of the first pressurizing substance, and the second jet substance has a heat capacity greater than a heat capacity of the second pressurizing substance.

Preferably, in the jet system of the present invention, the first storage section stores therein a third pressurizing substance for pressurizing the inside of the first storage section, and the second storage section stores therein a fourth pressurizing substance for pressurizing the inside of the second storage section.

Preferably, the jet system of the present invention further comprises: a first temperature control section for controlling an internal temperature of the first storage section to cause the first pressurizing substance to be vaporized, and a second temperature control section for controlling an internal temperature of the second storage section to vaporize the pressurizing second substance.

According to a third aspect of the present invention, there is provided a jet system comprising: 1st to n-th storage sections each defined as a k-th storage section containing a k-th jet substance and a k-th pressurizing substance, where k is an integer selected from 1 to n (where n is an integer of 2 or more) and is assigned in ascending order to each of the 1st to n-th storage sections; a jet flow creation section for creating a jet flow using the 1st to n-th jet substances stored, respectively, in the 1st to n-th storage sections; and a jet port for jetting a jet flow created by the jet flow creation section, wherein each of the 1st to n-th pressurizing substances is capable of being at least partially vaporized in a corresponding one of the 1st to n-th storage sections to thereby pressurize an inside of the corresponding one of the 1st to n-th storage sections.

Effect of Invention

The jet system of the present invention is capable of regulating the pressure of the jet substance by means of vaporization of the pressurizing substance, without using any separate high-pressure gas supply subsystem comprising a high-pressure gas supply tank, so that it becomes possible to reduce a possibility of leakage and reduce weight of the jet system.

BRIEF DESCRIPTION OF DRAWINGS

FIG. 13 is a graph depicting a pressure measurement result in Test 4.

FIG. 14 is a graph depicting a comparison between pressure measurement results in Tests 4 and 5.

DESCRIPTION OF EMBODIMENTS

Figure 1:
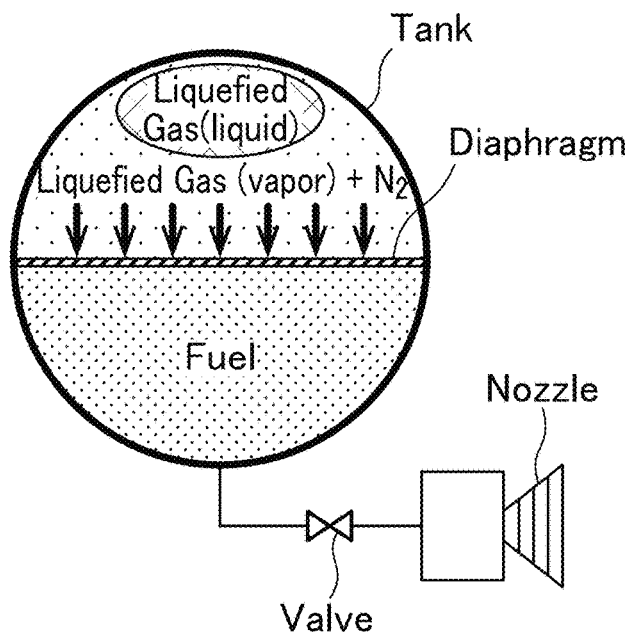
FIG. 1 is a conceptual diagram of a single-liquid type vapor-liquid equilibrium pressure regulation scheme taught by the present invention.

With reference to the drawings, a jet system of the present invention will now be described based on some preferred embodiments thereof. However, the jet system of the present invention is not limited to specific configurations disclosed in the drawings and related descriptions, but may be appropriately changed or modified within the spirit and scope of the present invention as set forth in appended claims. For example, in the following embodiments, liquefied gas is used as a pressurizing substance. Alternatively, the jet system of the present invention can also be implemented, e.g., in a configuration where a substance capable of being sublimated from solid to gas is used as a pressurizing substance, and an internal pressure of a storage section is restored based on the sublimation. Further, in a jet system according to one embodiment of the present invention, wherein it comprises a plurality of storage sections, a part or all of a first, second, - - - , and i-th (i: an integer of three or more) pressurizing substances may be identical to each other, or all of them may be different from each other in terms of type. In a jet system according to one embodiment of the present invention, wherein it uses additional pressurizing gas, it is possible to employ any type of gas as long as it has a low reactivity with the pressurizing substance. In a jet system according to one embodiment of the present invention, wherein it comprises a plurality of storage sections and uses additional pressurizing gas in each of the plurality of storage sections, a part or all of a first, second, - - - , and i-th (i: an integer of three or more) pressurizing gases may be identical to each other, or all of them may be different from each other in terms of type. Further, although in the following embodiments will be described based on an example where the jet system is designed for a jet system for a propulsion module, it should be understood that the jet system of the present invention can be used for any other purpose.

[Concept of Vapor-Liquid Equilibrium Pressure Regulation Scheme]

Figure 2A:
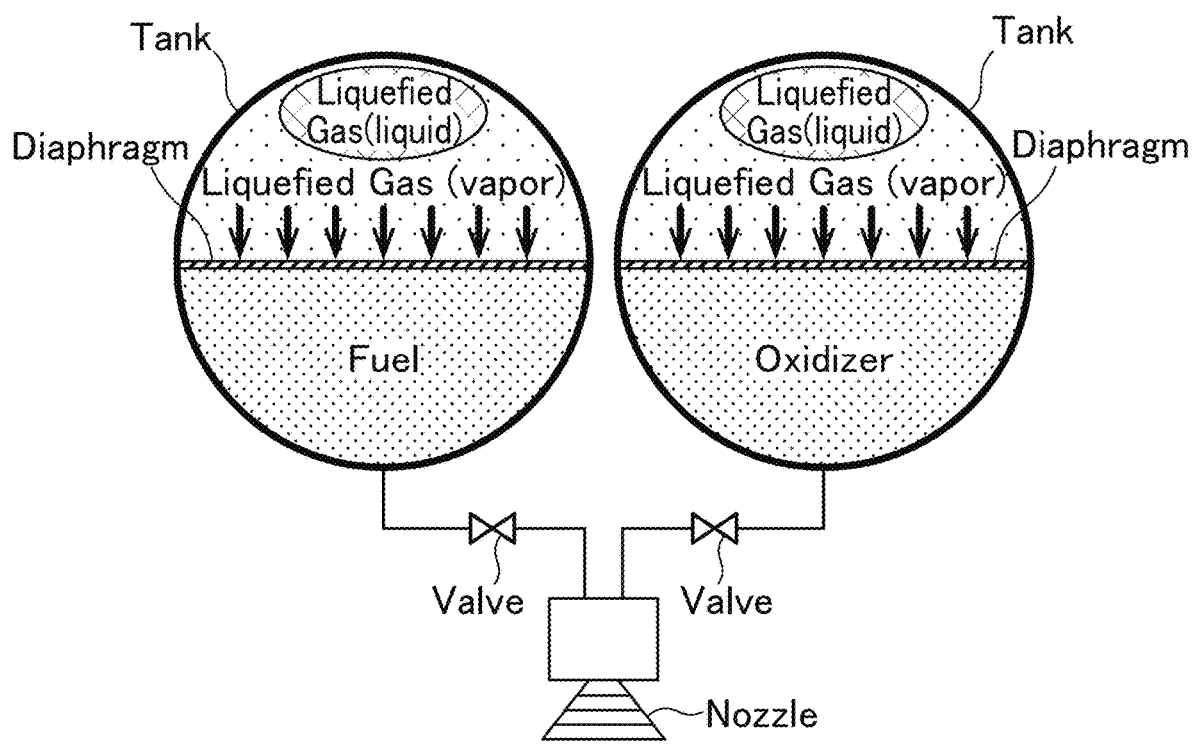
FIG. 2A is a conceptual diagram of a two-liquid type vapor-liquid equilibrium pressure regulation scheme taught by the present invention.
Figure 2B:
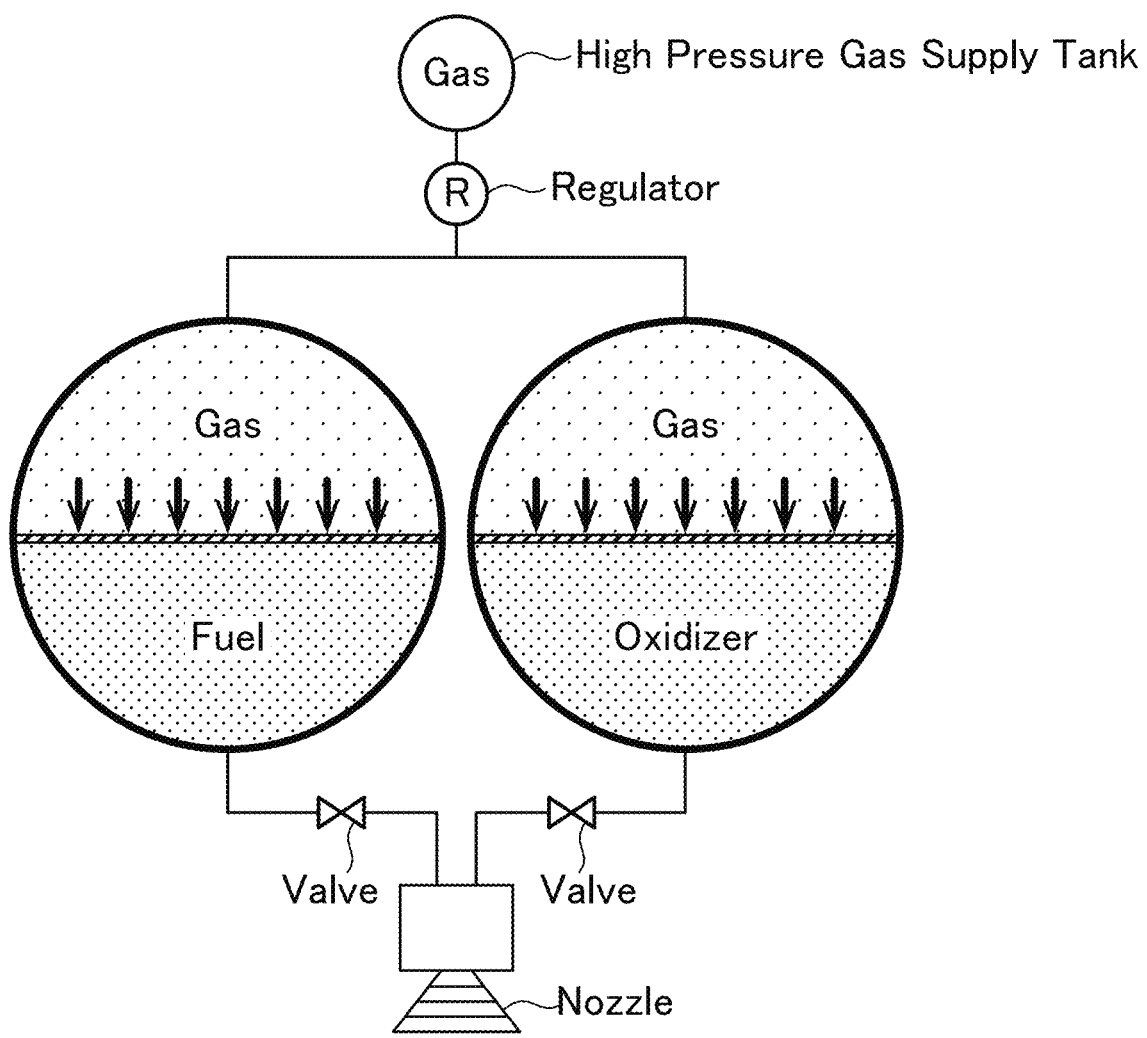
FIG. 2B is a conceptual diagram of a conventional pressure regulation scheme using a high-pressure gas supply subsystem.

As a new pressure regulation scheme for use in a propulsion system suitable, typically, for a small spacecraft, the present invention proposes a vapor-liquid equilibrium pressure regulation scheme. FIG. 1 and FIG. 2A depict, respectively, single-liquid type and two-liquid type vapor-liquid equilibrium pressure regulation schemes. Further, FIG. 2B is a conceptual diagram of a conventional pressure regulation scheme using a high-pressure gas supply subsystem.

In the vapor-liquid equilibrium pressure regulation scheme, liquefied gas serving as a pressurizing substance is used as "pushing gas" for pushing (liquid) fuel or (liquid) oxidizer (in case of the two-liquid type) serving as a jet substance stored in a tank. An inside of the tank is divided into two regions by a diaphragm serving as a separation member deformable under pressure, and a pressure is transmitted between a liquefied gas-side region and a fuel or oxidizer-side region through the diaphragm.

Even when discharge of the fuel or oxidizer from the tank for a thrust generation operation causes temporary lowering in internal pressure of the tank, the liquefied gas in a liquid state is vaporized, so that the internal pressure of the tank is regulated to a vapor pressure of the liquefied pressure. That is, irrespective of a remaining amount of the fuel or oxidizer, the inside of the tank is maintained in a vapor-liquid equilibrium state, and becomes constant at a saturated vapor pressure of the liquefied pressure (even in a situation where there is a large lowering in the pressure, or during continuous jet, the pressure is at least partially recovered). Thus, it becomes possible to stably supply the fuel or oxidizer to a reaction chamber (combustion chamber) of a propulsion module.

Compared with the conventional pressure regulation scheme using a high-pressure gas supply subsystem, the vapor-liquid equilibrium pressure regulation scheme is advantageous in the following respects.

1. There is no need to use a high-pressure gas supply tank and a regulator, so that it becomes possible to reduce weight of the entire system.
2. Any high-pressure gas supply subsystem is not used (i.e., the vapor pressure of the liquefied gas is a maximum pressure in the entire system), so that it becomes possible to reduce a possibility of leakage.
3. (In the two-liquid type) A fuel tank and an oxidizer tank are not directly connected to each other, so that there is no risk that the fuel and the oxidizer are mixed together in an unexpected location (e.g., in a high-pressure gas supply line on an upstream side of the tank).
4. (In the two-liquid type) A mixing ratio O/F of the oxidizer to the fuel can be controlled by controlling a temperature of the liquefied gas.

It is possible to reduce an amount of liquefied gas to be filled in the tank, and instead, add additional pushing gas such as nitrogen gas to thereby configure the vapor-liquid equilibrium pressure regulation scheme as a hybrid system. Although FIG. 1 depicts a configuration in which nitrogen gas $N_2$ is added to a single-liquid vapor-liquid equilibrium pressure regulation scheme, such additional pushing gas can be added to a two-or more-liquid vapor-liquid equilibrium pressure regulation scheme in the same manner. In this case, it becomes possible to further reduce the weight of the entire system and increase a total internal pressure of the tank, although the internal pressure of the tank is not uniform. Further, it becomes possible to estimate a remaining amount of the fuel or oxidizer, based on a measured internal pressure of the tank.

[Configuration of Jet System]

Figure 3A:
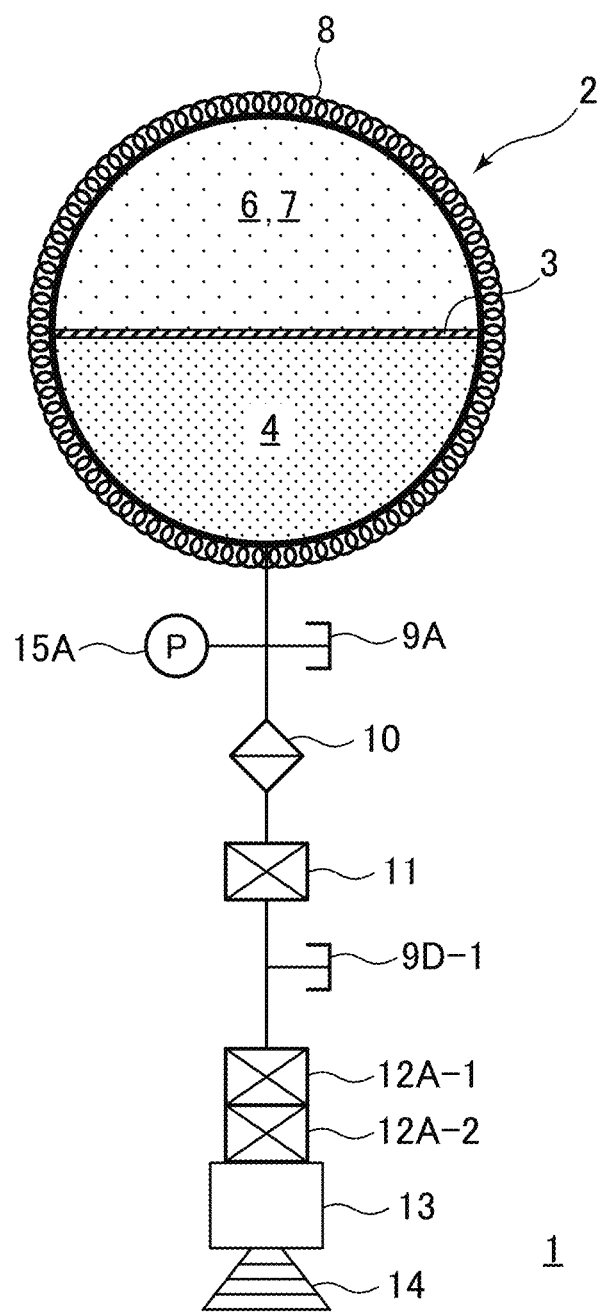
FIG. 3A is a system diagram depicting a single-liquid type jet system according to a first embodiment of the present invention.

FIG. 3A is a system diagram depicting a single-liquid type jet system 1 (propulsion module) according to a first embodiment of the present invention, applicable to a propulsion system for a small spacecraft. The jet system 1 comprises a storage container 2, a fill and drain valve 9A, a filter 10, a latch-type solenoid valve 11, a test port 9D-1, a pressure sensor 15A, propellant valves 12A-1, 12A-2, a reaction chamber 13, and a jet port 14.

Configurations of the valves, filter, line and others are roughly the same as those described in FIG. 1 and others of the JP 2015-214956 A. That is, liquid fuel is filled into or discharged from the storage container 2 via the fill and drain valve 9A, and impurities in the liquid fuel discharged from the storage container 2 are removed through the filter 10. Then, by switching operations of the latch-type solenoid valve 11 and the propellant valves 12A-1, 12A-2, passing of the resulting impurities-free liquid fuel with respect to the reaction chamber 13 is controlled.

The storage container 2, a combination of the latch-type solenoid valve 11 and the propellant valves 12A-1, 12A-2, and the reaction chamber 13 in this embodiment are equivalent, respectively, to a storage section, a jet substance supply section and a jet flow creation section set forth in the appended claims.

In the reaction chamber 13, the liquid fuel is placed under an action of a catalyst (e.g., iridium-containing catalyst in the case where hydrazine is used as the liquid fuel) to thereby create a jet gas flow, and the jet gas flow is ejected from the jet port 14 to generate thrust (propulsive force).

Figure 3B:
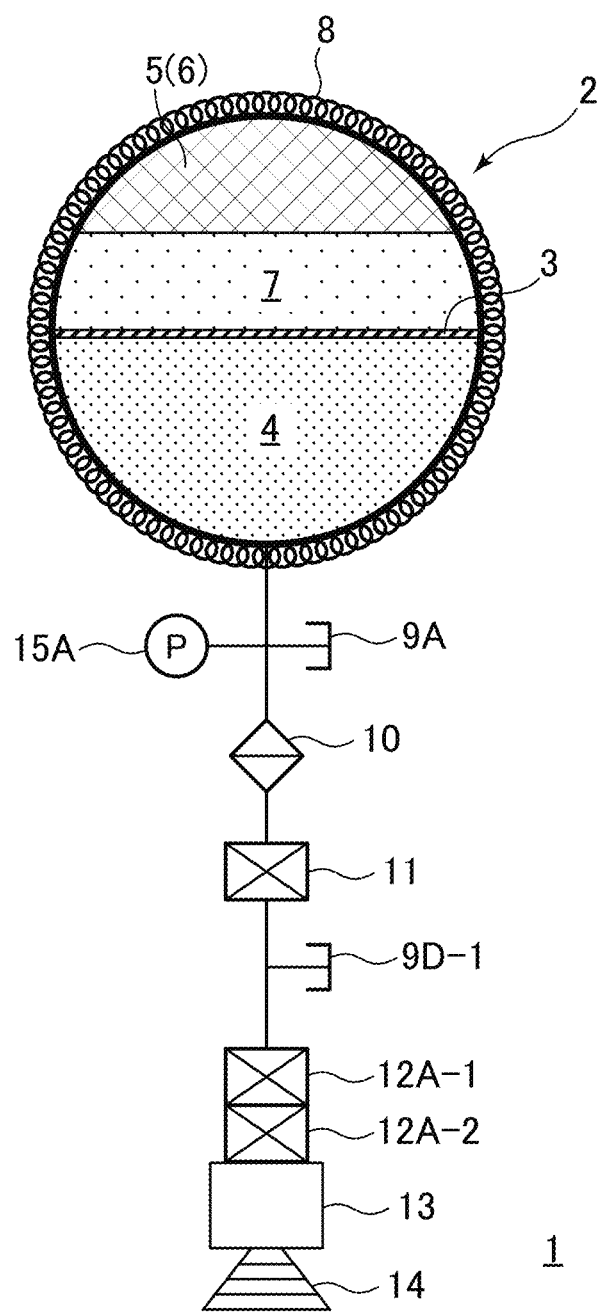
FIG. 3B is a system diagram depicting one example of a modification of the single-liquid type jet system in FIG. 3A.

The storage container 2 is made of SUS (stainless steel) or the like as with the Patent Document 2. An inside (internal space) of the storage container 2 is divided into two regions by a diaphragm 3 made of a material deformable under pressure, such as rubber. In this storage container 2, liquid fuel 4 such as hydrazine ($N_2H_4$) serving as the jet substance is stored in one of the regions, and liquefied gas such as alternative chlorofluorocarbon HFC-218 ($C_3F_8$) serving as the pressurizing substance is stored in the other region. In this embodiment, liquefied gas 6 in a liquid state and liquefied gas 7 in a vapor state are stored in the liquefied gas-side region of the storage container 2. These liquefied gases may be stored in the form of a mixture as depicted in FIG. 3A, or the liquid-state liquefied gas 6 may be held by a foam metal 5 functioning as a pressurizing substance holding section for holding the pressurizing substance, as depicted in FIG. 3B as one example of a modification of the jet system in FIG. 3A. In the configuration depicted in FIG. 3B, as one example, a foam metal 5 made of copper or SUS and having a porosity of about 95% is attached to an inner wall of the liquefied gas-side region of the storage container 2 by using an adhesive, and the liquid-state liquefied gas 6 is held by surface tension in a vapor-liquid interface formed with respect to each pore, as with the Patent Document 2 (paragraph [0004] in the Patent Document 2, and the Patent Document 1). The vapor-state liquefied gas 7 is stored in a remaining space of the liquefied gas-side region as depicted in FIG. 3B.

In the liquefied gas-side region, a vapor pressure of the vapor-state liquefied gas 7 is dominant with respect to a gravitational force acting on the liquid-state liquefied gas 6, so that it is not essential to hold the liquid-state liquefied gas 6 by the foam metal 5. However, it is believed that the holding makes it possible to stabilize attitude control of the jet system 1, and facilitate heat transfer from an aftermentioned heater 8 to the liquefied gas. On the other hand, the use of the foam metal 5 causes an increase in weight of the jet system 1. Thus, from a viewpoint of reducing the weight of the jet system, it is preferable to employ the configuration depicted in FIG. 3A. The jet system of the present invention can be implemented in either of the configuration using a foam metal and the configuration using no foam metal (this will also be applied to modifications depicted in FIGS. 4 and 5, and two-liquid type and three or more-type jet systems depicted in FIGS. 6 and 7).

Further, a heater 8 is attached to an outer wall of the storage container 2 over the entire circumference thereof to serve as a temperature control section for, based on an internal temperature of the storage container 2 detected by a non-depicted temperature sensor, controlling the internal temperature of the storage container 2 to cause the liquid-state liquefied gas 6 to be vaporized.

In FIGS. 3A and 3B, line segments connecting respective ones of the components denote lines (pipe lines), as with the Patent Document 2. The pressure sensor 15A and the test port 9D-1 are also the same as those comprised in the configuration described in the Patent Document 2. Specifically, the presence or absence of leakage is checked by opening the test port 9D-1 in a closed state of the propellant valves 12A-1, 12A-2 and injecting helium gas into the line, while monitoring an internal pressure of the line by the pressure sensor 15A.

[Operation of Jet System]

An operation of the jet system 1 will be described below. The following description will be made on an assumption that controls of switching of solenoid valves and operations of a heater, various sensors and others are performed by remote control via an arbitrary control circuit (not depicted), and liquid-filling (gas-filling) and liquid-discharge (gas-discharge) from each fill and drain valve are typically performed by an operator, as with the Patent Document 2. However, specific means for performing these controls and operations may be appropriately changed and modified depending on embodiments. Further, the following description will be made on an assumption that the liquefied gases 6 (liquid), 7 (vapor) are preliminarily stored in the liquefied gas-side region of the storage container 2 (a fill and drain valve for filling the liquefied gas and other elements in a gas filling line are not depicted).

As preparation for operation of the jet system 1, first of all, the liquid fuel 4 is filled from the fill and drain valve 9A into the liquid fuel-side region of the storage container 2. The liquefied gas-side region of the storage container 2 is in a vapor-liquid equilibrium state of the liquefied gas, and the diaphragm 3 is pressed by the vapor pressure of the liquefied gas. As a result of deformation of the diaphragm by the pressing force, a pressure is also applied to the liquid fuel 4. In this state, when the latch-type solenoid valve 11 is opened, and further the propellant valves 12A-1, 12A-2 are opened, the liquid fuel 4 discharged from the storage section 2 by the vapor pressure of the liquefied gas and subjected to removal of impurities through the filter 10 is supplied to the reaction chamber 13, and placed under action of the catalyst to generate a jet gas flow. The jet gas flow is ejected from the jet port 14 to thereby generate thrust (propulsive force).

Although the internal pressure of the storage container 2 is temporarily lowered as a result of discharge of the liquid fuel 4 from the storage container 2, the internal pressure is restored based on vaporization of the liquid-state liquefied gas 6. In the case where there is a sufficient time interval before a subsequent jet operation, the liquid-state liquefied gas 6 and the vapor-state liquefied gas 7 stored in the liquefied gas-side region of the storage container 2 are returned to the vapor-liquid equilibrium state, and the internal pressure thereof is also restored to the vapor pressure of the liquefied gas.

Then, when the vapor-state liquefied gas 7 is expanded due to the jet operation, and the internal temperature of the storage container 2 is lowered, the vapor pressure is also lowered, in many types of liquefied gases, thereby causing a reduction in internal pressure of the storage container 2. In this case, the storage container 2 can be heated by the heater so as to restore the internal temperature and pressure of the storage container 2. However, in a situation where the liquid fuel 4 has a heat capacity greater than those of the liquefied gases 6, 7, and temperature is maintained by heat transfer from the liquid fuel 4 into the liquefied gases 6, 7, the reduction in the internal pressure is not significant, in some cases. In the jet system 1 according to this embodiment, it is not essential to use the heater 8.

The heater 8 can be controlled to arbitrarily change the internal temperature of the storage container 2 to thereby control the vapor pressure of the liquefied gas, and thus control a pressure to be applied to the liquid fuel 4 through the diaphragm 3, to finally adjust a supply amount (supply rate) of the liquid fuel 4. Further, as already mentioned, additional pushing gas such as nitrogen gas may be stored in the liquefied gas-side region of the storage container 2. In this case, it becomes possible to increase the internal pressure of the storage container 2 to increase the supply amount of the liquid fuel 4.

[Modifications]

Figure 4:
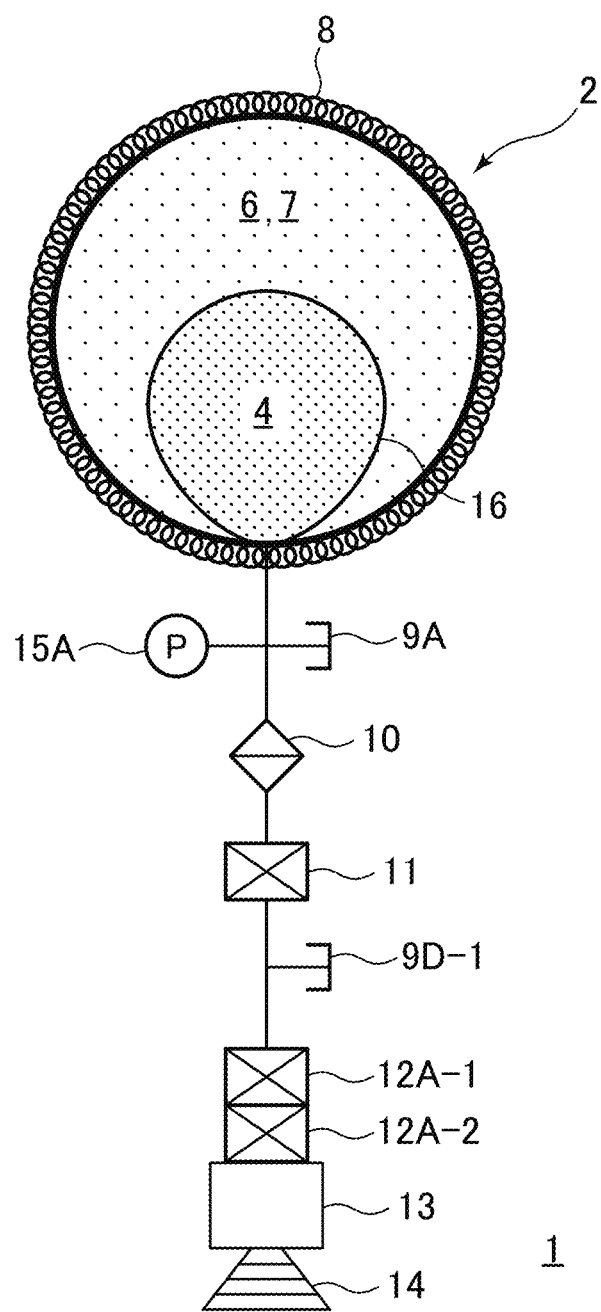
FIG. 4 is a system diagram depicting another example of the modification of the single-liquid type jet system in FIG. 3A.

The internal configuration of the storage container 2 is not limited to those depicted in FIGS. 3A and 3B, but may be arbitrarily changed and modified to an extent enabling the present invention to be implemented. As one example, instead of the diaphragm 3, the separation member may be composed of a bag-shaped bladder 16 made of a material deformable under pressure, such as rubber, and installed to divide the internal space of the storage container into a liquid fuel-side region and a liquefied gas-side region (FIG. 4). When the bladder 16 is pressed and deformed by the vapor pressure of the liquefied gas, the liquid fuel 4 is discharged from the storage container 2. Subsequently, a jet operation can be performed in the same manner as that in the configurations depicted in FIGS. 3A and 3B.

Figure 5:
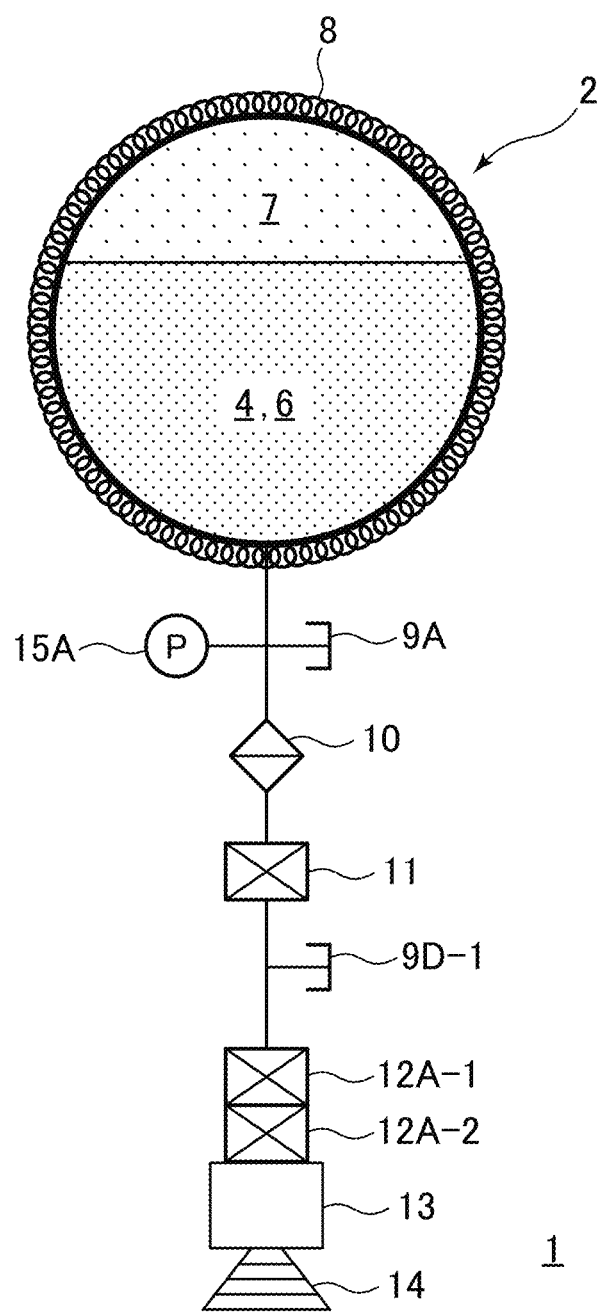
FIG. 5 is a system diagram depicting yet another example of the modification of the single-liquid type jet system in FIG. 3A.

Alternatively, the jet system 1 may be configured without using any separation member such as the diaphragm 3 or the bladder 16 (FIG. 5). In this case, the liquid fuel 4 and the liquid-state liquefied gas 6 are mixed with each other in the storage container 2. Then, the resulting mixture is pressed by the vapor-state liquefied gas 7 and discharged from the storage container 2. The discharged mixture of the liquid fuel 4 and the liquid-state liquefied gas 6 is sent to the reaction chamber 13 in the same manner as that in the configurations depicted in FIGS. 3A and 3B, and placed under action of the catalyst to generate a jet das flow. The resulting jet gas flow and the liquefied gas are ejected from the jet port to thereby generate thrust.

[Configuration of Jet System]

Figure 6:
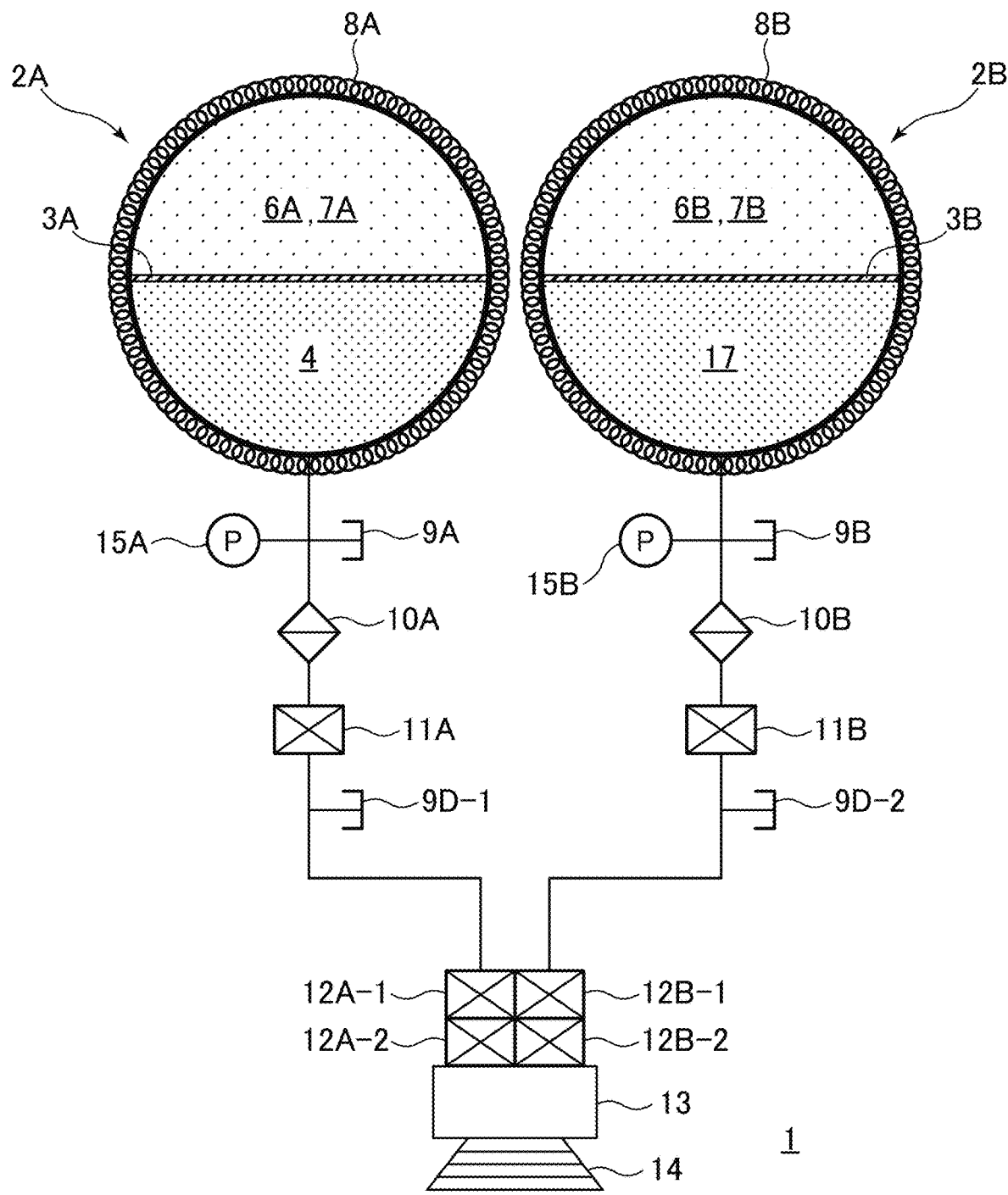
FIG. 6 is a system diagram depicting a two-liquid type jet system according to a second embodiment of the present invention.

FIG. 6 is a system diagram depicting a two-liquid type jet system 1 according to a second embodiment of the present invention. The two-liquid type jet system 1 comprises two sets of the following components of the single-liquid type jet system 1 in FIG. 3A: the storage container 2, the fill and drain valve 9A, the filter 10, the latch-type solenoid valve 11, the test port 9D-1, the pressure sensor 15A and the propellant valves 12A-1, 12A-2, which are arranged in this order in a downstream direction, and the same components as the remaining downstream components of the single-liquid type jet system 1. The second embodiment will be described based on an example where a jet gas flow is generated by combustion between liquid fuel and oxidizer. Thus, differently from the single-liquid type jet system 1, instead of a catalytic reaction, a combustion reaction is performed in the reaction chamber 13. In the configuration illustrated in FIG. 6, the same element or component as that in configuration illustrated in FIG. 3 is designated by the same reference sign, and its description will be appropriately omitted.

In the jet system 1 depicted in FIG. 6, a first storage container 2A is divided into a liquid fuel-side region and a liquefied gas-side region by a diaphragm 3A serving as a first separation member. In the first storage container 2A, liquid fuel 4 serving as a first jet substance, such as hydrazine, is stored in the liquid fuel-side region, and liquefied gas serving as a first pressurizing substance, such as alternative chlorofluorocarbon HFC-218, is stored in the liquefied gas-side region. In the system configuration in FIG. 6, a liquid-state liquefied gas 6A and a vapor-state liquefied gas 7A are not particularly separated from each other. Alternatively, as with the configuration in FIG. 3B, the liquid-state liquefied gas 6A may be held by a foam metal serving as the pressurizing substance holding member, and the vapor-state liquefied gas 7A may be stored in a remaining space of the liquefied gas-side region of the first storage container 2A. Although a second storage container 2B has the same configuration as that of the first storage container 2A, oxidizer 17 serving as a second jet substance, such as dinitrogen tetraoxide, is contained in one of two regions divided by a diaphragm 3B serving as a second separation member, instead of the liquid fuel 4. As to a liquefied gas-side region, liquefied gas serving as a second pressurizing substance, such as alternative chlorofluorocarbon HFC-218, is stored, as with the first storage container 2A. Whereas the diaphragm 3A is made of rubber or the like, the diaphragm 3B is preferably made of a metal having a low chemical reactivity with the oxidizer 17.

[Operation of Jet System]

The following description will be made on an assumption that the liquefied gases 6A (liquid), 7A (vapor) are preliminarily stored in the liquefied gas-side region of the storage container 2A, as with the first embodiment, and the liquefied gases 6B (liquid), 7B (vapor) are stored in the liquefied gas-side region of the storage container 2B in the same manner (a fill and drain valve for filling the liquefied gas and other elements in a gas filling line are not depicted). As preparation for operation of the jet system 1, first of all, the liquid fuel 4 is filled from the fill and drain valve 9A into the liquid fuel-side region of the storage container 2A, and the oxidizer 19 is filled from the fill and drain valve 9B into the liquid fuel-side region of the storage container 2B. Each of the liquefied gas-side regions of the storage containers 2A, 2B is in a vapor-liquid equilibrium state of the liquefied gas, and each of the diaphragms 3A, 3B is pressed by the vapor pressure of the liquefied gas. As a result of deformation of each of the diaphragms 3A, 3B by the pressing force, a pressure is also applied to a corresponding one of the liquid fuel 4 and the oxidizer 17. In this state, when the latch-type solenoid valves 11A, 11B are opened, and further the propellant valves 12A-1, 12A-2 and the propellant valves 12B-1, 12B-2 are opened, the liquid fuel 4 and the oxidizer 17 discharged from the storage sections 2A, 2A by the vapor pressure of the liquefied gas and subjected to removal of impurities through the filters 10A, 10B, respectively, are supplied to the reaction chamber 13. Then, the liquid fuel 4 and the oxidizer 17 are mixed together and combusted in the reaction chamber 13 to generate a jet gas flow. The jet gas flow is ejected from the jet port 14 to thereby generate thrust (propulsive force).

Although the internal pressures of the storage containers 2A, 2B are temporarily lowered as a result of discharge of the liquid fuel 4 from the storage container 2A and discharge of the oxidizer 17 from the storage container 2B, the internal pressure is restored based on vaporizations of the liquid-state liquefied gases 6A, 6B. In the case where there is a sufficient time interval before a subsequent jet operation, the liquefied gas-side region of each of the storage containers 2A, 2B is returned to the vapor-liquid equilibrium state, and the internal pressure thereof is also restored to the vapor pressure of the liquefied gas.

Then, when each of the vapor-state liquefied gases 7A, 7B is expanded due to the jet operation, and the internal temperature of a corresponding one of the storage containers 2A, 2B is lowered, the vapor pressure is also lowered, in many types of liquefied gases, thereby causing a reduction in internal pressure of the corresponding one of the storage containers 2A, 2B. In this case, each of the storage containers 2A, 2B can be heated by a corresponding one of two heaters 8A, 8B so as to restore the internal temperature and pressure of each of the storage containers 2A, 2B. However, in a situation where the liquid fuel 4 (the oxidizer 17) has a heat capacity greater than those of the liquefied gases 6A, 7A (the liquefied gases 6B, 7B), and temperature is maintained by heat transfer from the liquid fuel 4 into the liquefied gases 6A, 7A (from the oxidizer 17 into the liquefied gases 6B, 7B), the reduction in the internal pressure is not significant, in some cases. In the jet system 1 according to the second embodiment, it is not essential to use the heaters 8A, 8B.

The heater 8A (the heater 8B) configured to, based on an internal temperature of the storage container 2A (the storage container 2B) detected by a non-depicted temperature sensor, control the internal temperature of the storage container 2A (the storage container 2B) to cause the liquid-state liquefied gas 6A (the liquid-state liquefied gas 6B) to be vaporized can be controlled to arbitrarily change the internal temperature of the storage container 2A (the storage container 2B) to thereby control the vapor pressure of the liquefied gas, and thus control a pressure to be applied to the liquid fuel 4 through the diaphragm 3A (to be applied to the oxidizer 17 through the diaphragm 3B), to finally adjust a supply amount (supply rate) of the liquid fuel 4 (the oxidizer 17). The heater 8A and the heater 8B may be controlled independently. In this case, when the internal temperatures of the storage containers 2A, 2B are controlled independently to control a supply amount of the liquid fuel 4 and a supply amount of the oxidizer 17 independently, it becomes possible to arbitrarily control a mixing ratio O/F of the oxidizer 17 to the liquid fuel 4. Further, as already mentioned, additional pushing gas serving as a second pressurizing substance, such as nitrogen gas, may be stored in the liquefied gas-side region(s) of one or both of the storage containers 2A, 2B. In this case, it becomes possible to increase the internal pressure(s) of one or both of the storage containers 2A, 2B to increase the supply amount(s) of one or both of the liquid fuel 4 and the oxidizer 17. Further, in the two-liquid type jet system, one or both of the storage containers 2A, 2B may be configured such that a bladder is used instead of a diaphragm, as with the configuration depicted in FIG. 4, or fuel or oxidizer is mixed with liquefied gas without separating the internal space of the storage container into two regions, as with the configuration of the modification depicted in FIG. 5.

[Configuration of Jet System]

Figure 7:
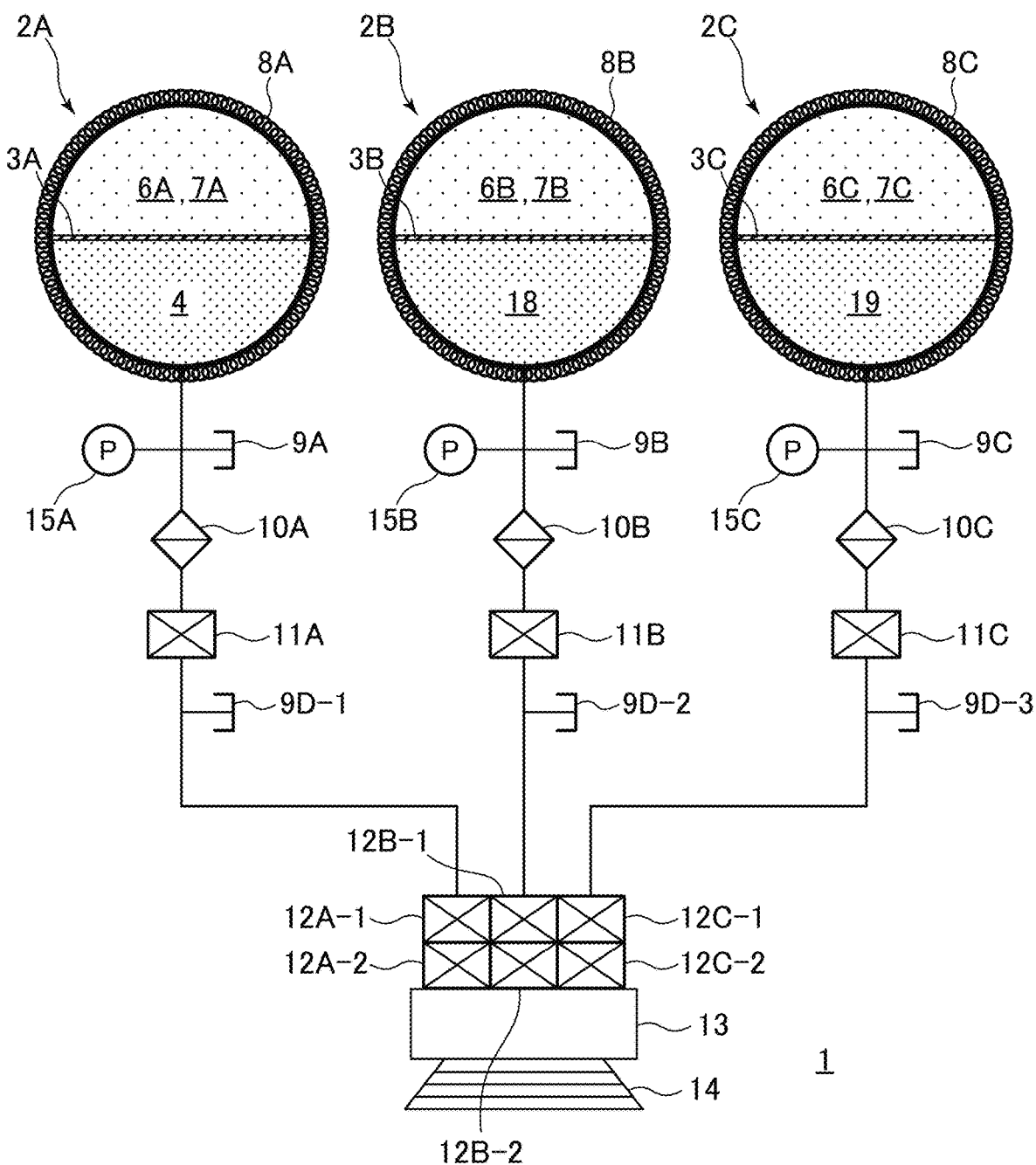
FIG. 7 is a system diagram depicting a three-liquid type jet system according to a third embodiment of the present invention.

FIG. 7 is a system diagram depicting a three-liquid type jet system 1 according to a third embodiment of the present invention. The three-liquid type jet system 1 comprises three sets of the following components of the single-liquid type jet system 1 in FIG. 3A: the storage container 2, the fill and drain valve 9A, the filter 10, the latch-type solenoid valve 11, the test port 9D-1, the pressure sensor 15A and the propellant valves 12A-1, 12A-2, which are arranged in this order in the downstream direction, and the same components as the remaining downstream components of the single-liquid type jet system 1. The third embodiment will be described based on an example where a jet gas flow is generated by combustion of three types of liquid fuels. Thus, differently from the first and second embodiments, a combustion reaction of three types of liquid fuels is performed in the reaction chamber 13. As another example, the three-liquid type jet system 1 may be configured such that two different types of liquid fuels are contained, respectively, in two storage containers, and oxidizer is stored in one storage container. In the configuration illustrated in FIG. 7, the same element or component as that in configuration illustrated in FIG. 3 is designated by the same reference sign, and its description will be appropriately omitted.

In the jet system 1 depicted in FIG. 7, a storage container 2A is divided into a liquid fuel-side region and a liquefied gas-side region by a diaphragm 3A. In the storage container 2A, liquid fuel 4 is stored in the liquid fuel-side region, and liquefied gas such as HFC-218 is stored in the liquefied gas-side region. In the system configuration in FIG. 7, a liquid-state liquefied gas 6A and a vapor-state liquefied gas 7A are not particularly separated from each other. Alternatively, as with the configuration in FIG. 3B, the liquid-state liquefied gas 6A may be held by a foam metal, and the vapor-state liquefied gas 7A may be stored in a remaining space of the liquefied gas-side region of the storage container 2A. Although each of two storage containers 2B, 2C has the same configuration as that of the storage container 2A, different types of liquid fuels 18, 19 are contained, respectively, in one of two regions divided by a diaphragm 3B and one of two regions divided by a diaphragm 3C. A liquefied gas-side region is the same as that in the storage container 2A.

[Operation of Jet System]

The following description will be made on an assumption that the liquefied gases 6A (liquid), 7A (vapor) are preliminarily stored in the liquefied gas-side region of the storage container 2A, as with the first embodiment. Similarly, the liquefied gases 6B (liquid), 7B (vapor) are stored in the liquefied gas-side region of the storage container 2B, and the liquefied gases 6C (liquid), 7C (vapor) are stored in the liquefied gas-side region of the storage container 2C (a fill and drain valve for filling the liquefied gas and other elements in a gas filling line are not depicted). As preparation for operation of the jet system 1, first of all, the liquid fuels 4, 18, 19 are filled, respectively, from the fill and drain valves 9A, 9B, 9C into the liquid fuel-side regions of the storage containers 2A, 2B, 2C. Each of the liquefied gas-side regions of the storage containers 2A, 2B, 2C is in a vapor-liquid equilibrium state of the liquefied gas, and each of the diaphragms 3A, 3B, 3B is pressed by the vapor pressure of the liquefied gas. As a result of deformation of each of the diaphragms 3A, 3B, 3C by the pressing force, a pressure is also applied to a corresponding one of the liquid fuels 4, 18, 19. In this state, when the latch-type solenoid valves 11A, 11B, 11C are opened, and further the propellant valves 12A-1, 12A-2, the propellant valves 12B-1, 12B-2 and the propellant valves 12C-1, 12-C are opened, the liquid fuels 4, 18, 19 discharged from the storage sections 2A, 2A, 2C by the vapor pressure of the liquefied gas and subjected to removal of impurities through the filters 10A, 10B, 10C, respectively, are supplied to the reaction chamber 13. Then, the liquid fuels 4, 18, 19 are mixed together and combusted in the reaction chamber 13 to generate a jet gas flow. The jet gas flow is ejected from the jet port 14 to thereby generate thrust (propulsive force).

Although the internal pressures of the storage containers 2A, 2B, 2C are temporarily lowered as a result of discharge of the liquid fuels 4, 18, 19 from the storage containers 2A, 2B, 2C, the internal pressure is restored based on vaporizations of the liquid-state liquefied gases 6A, 6B, 6C. In the case where there is a sufficient time interval before a subsequent jet operation, the liquefied gas-side region of each of the storage containers 2A, 2B, 2C is returned to the vapor-liquid equilibrium state, and the internal pressure thereof is also restored to the vapor pressure of the liquefied gas.

Then, when each of the vapor-state liquefied gases 7A, 7B, 7C is expanded due to the jet operation, and the internal temperature of a corresponding one of the storage containers 2A, B, 2C is lowered, the vapor pressure is also lowered, in many types of liquefied gases, thereby causing a reduction in internal pressure of the corresponding one of the storage containers 2A, 2B, 2C. In this case, each of the storage containers 2A, 2B, 2C can be heated by a corresponding one of three heaters 8A, 8B, 8C so as to restore the internal temperature and pressure of each of the storage containers 2A, 2B, 2C. However, in a situation where the liquid fuel 4 (liquid fuel 18; liquid fuel 19) has a heat capacity greater than those of the liquefied gases 6A, 7A (the liquefied gases 6B, 7B; the liquefied gases 6C, 7C), and temperature is maintained by heat transfer from the liquid fuel 4 (liquid fuel 18; liquid fuel 19) into the liquefied gases 6A, 7A (from the oxidizer 18 into the liquefied gases 6B, 7B; from the oxidizer 19 into the liquefied gases 6C, 7C), the reduction in the internal pressure is not significant, in some cases. In the jet system 1 according to the third embodiment, it is not essential to use the heaters 8A, 8B or 8C.

The heater 8A (the heater 8B; the heater 8C) can be controlled to arbitrarily change the internal temperature of the storage container 2A (the storage container 2B; the storage container 2C) to thereby control the vapor pressure of the liquefied gas, and thus control a pressure to be applied to the liquid fuel 4 (the liquid fuel, 18; the liquid fuel 19) through the diaphragm 3A (to be applied to the liquid fuel 18 through the diaphragm 3B; to be applied to the liquid fuel 19 through the diaphragm 3C), to finally adjust a supply amount (supply rate) of the liquid fuel 4 (the liquid fuel, 18; the liquid fuel 19). The heaters 8A, 8B, 8C may be controlled independently. In this case, when the internal temperatures of the storage containers 2A, 2B, 2C are controlled independently to control respective supply amounts of the liquid fuels 4, 18, 19 independently, it becomes possible to arbitrarily control a mixing ratio among the liquid fuels 4, 18, 19. Further, as already mentioned, additional pushing gas serving as a second pressurizing substance, such as nitrogen gas, may be stored in the liquefied gas-side region(s) of one or more of the storage containers 2A, 2B, 2C. In this case, it becomes possible to increase the internal pressure(s) of one or more of the storage containers 2A, 2B, 2C to increase the supply amount(s) of one or more of the liquid fuels 4, 18, 19. Further, in the three-liquid type jet system, one or more of the storage containers 2A, 2B, 2C may be configured such that a bladder is used instead of a diaphragm, as with the configuration depicted in FIG. 4, or fuel or oxidizer is mixed with liquefied gas without separating the internal space of the storage container into two regions, as with the configuration of the modification depicted in FIG. 5. A four or more-liquid type jet system can be configured based on the same principle.

[Jet Test]

As one example of the jet system of the present invention, a single-liquid type jet system was constructed, and subjected to a jet test.

[Configuration]

Figure 8:
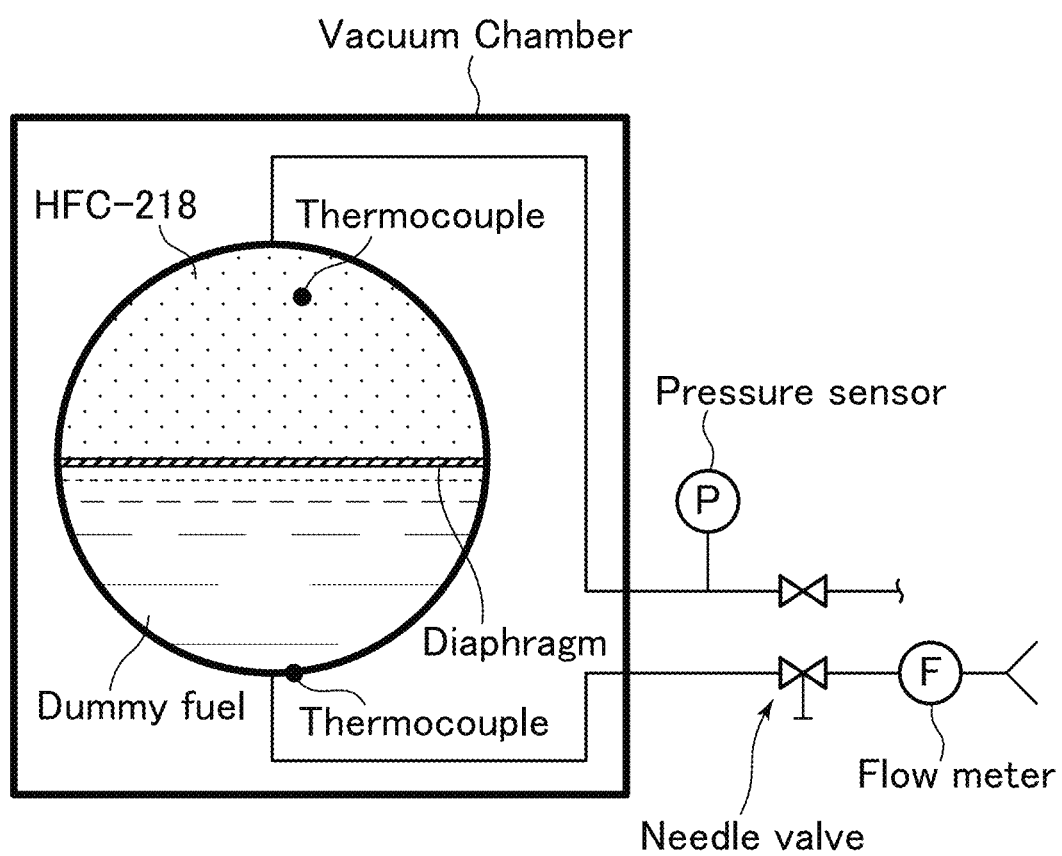
FIG. 8 is a schematic diagram depicting a single-liquid type jet system using a jet test.
Figure 9:
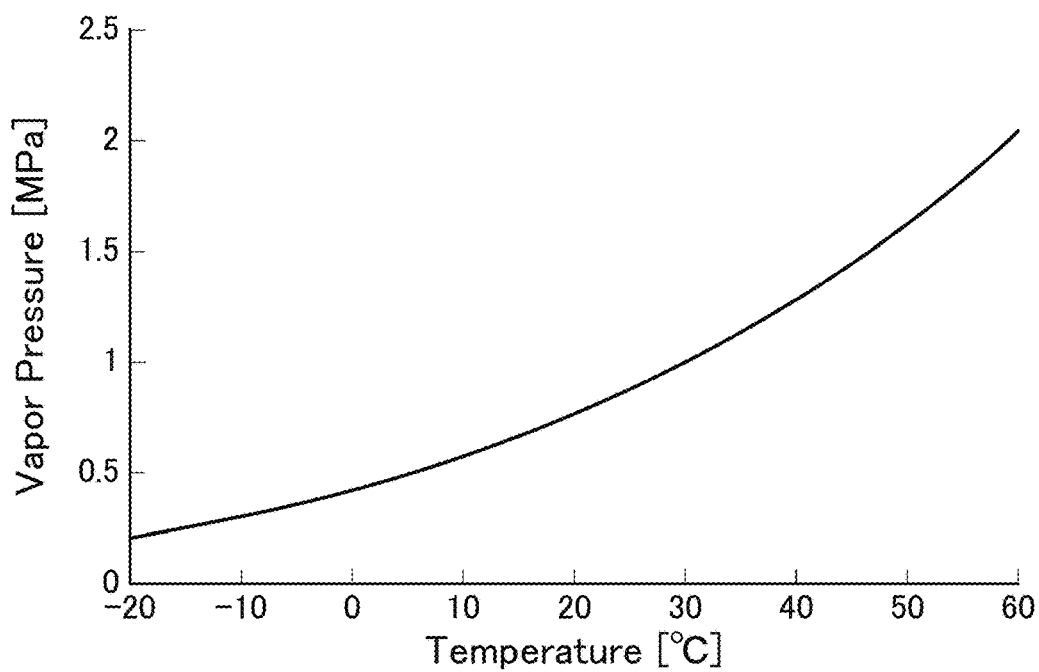
FIG. 9 is a graph depicting a vapor pressure curve of alternative chlorofluorocarbon HFC-218 ($C_3F_8$) (quotation from the Non-Patent Document 3).
Figure 10:
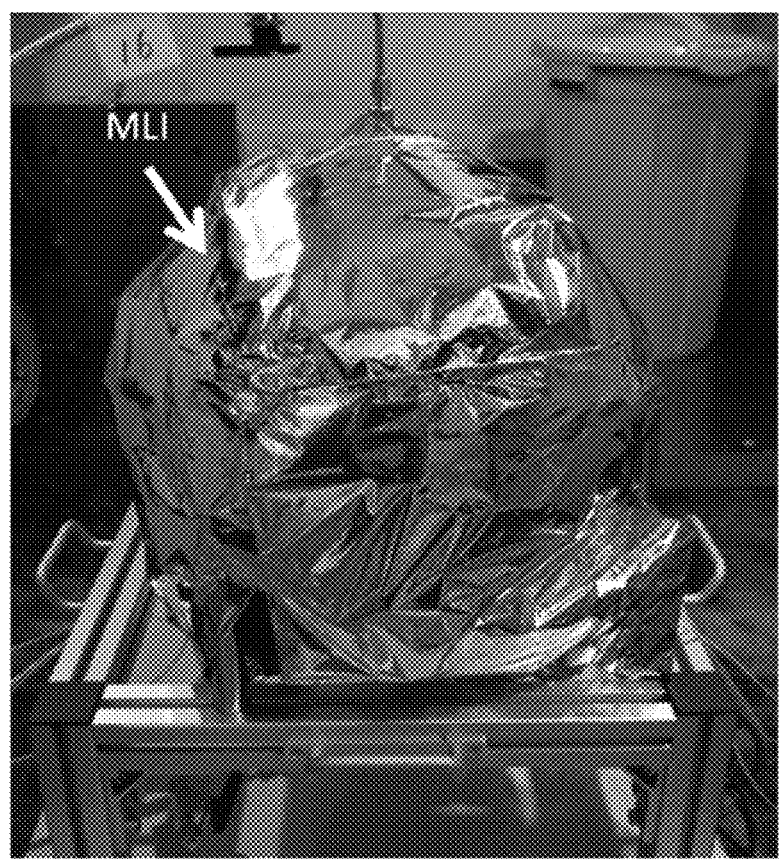
FIG. 10 is a picture presenting an external appearance of a fuel tank used in the jet test.

FIG. 8 is a schematic diagram depicting a single-liquid type jet system using the jet test. An inside of a spherical tank designed for a small spacecraft and having a diameter of 400 mm and a volume of 38 L was divided into two regions by a diaphragm, wherein HFC-218 serving as pushing gas (its vapor pressure curve is depicted in FIG. 9, see the Non-Patent Document 3; filling amount=2.5 kg or 1.0 kg, see Table 1) was stored in one of the regions, and water as dummy fuel was stored in the other region. In order to prevent HFC-218 from expanding due to heat received from the outside, so as to avoid a negative influence on a measurement result, and simulate an actual satellite-mounted configuration, the fuel tank was wrapped by a multilayer insulation (MLI, generally prepared by using aluminum-deposited polyimide and a aluminum-deposited mylar film, respectively, as an outermost layer and an inner layer, and further using polyester net to prevent inter-layer contact), and further put into a vacuum chamber so as to be thermally insulated from the outside (FIG. 10).

While test conditions were changed as presented in Table 1, the jet test was performed 5 times to measure a pressure of the tank on a HFC-218 side (which is fundamentally equal to a fuel-side pressure), a temperature of a HFC-218-side tank surface, and a temperature of a dummy fuel-side tank surface. An initial flow rate at start of jet (Table 1) was set by adjusting a fuel-side needle value. Assuming a thruster having a flow rate of 1 g/s (=60 mL/min), Tests 1 to 3 are equivalent to three cases where 4 thrusters, 2 thrusters, and 8 thrusters are simultaneously jetted, respectively. In Tests 1 to 3, HFC-218 was filled in an amount of 2.5 kg, whereas in Test 4, the filling amount was reduced to 1.0 kg. This setting corresponds a setting intended to reduce the filling amount of HFC-218 sp as to reduce weight of a single-liquid prolusion system, while permitting a HFC-218 liquid phase to be run out (fully vaporized) in a last stage of a jet operation. In Test 5, although the filling amount of HFC-218 was 1.0 kg, nitrogen gas as additional pushing gas was added by 0.33 MPa in terms of partial pressure, so that the jet system was configured as a hybrid vapor-liquid equilibrium pressure regulation scheme. In all of Tests 1 to 5, after setting a filling amount of the dummy fuel to about 25 kg in a single uniform way to set the initial flow rate, a continuous jet operation was performed. No temperature control was performed.

TABLE 1

| Test No. | Filling amount of HFC-218 [kg] | Initial flow rate [mL/min] | Addition of $N_2$ | Note |
|---|---|---|---|---|
| 1 | 2.5 | 240 | Non | Nominal (4 thrusters) |
| 2 | 2.5 | 120 | Non | 2 thrusters |
| 3 | 2.5 | 480 | Non | 8 thrusters |
| 4 | 1.0 | 240 | Non | Run out in mid-course |
| 5 | 1.0 | 240 | Added | Hybrid |

[Test Results and Discussion]

Figure 11:
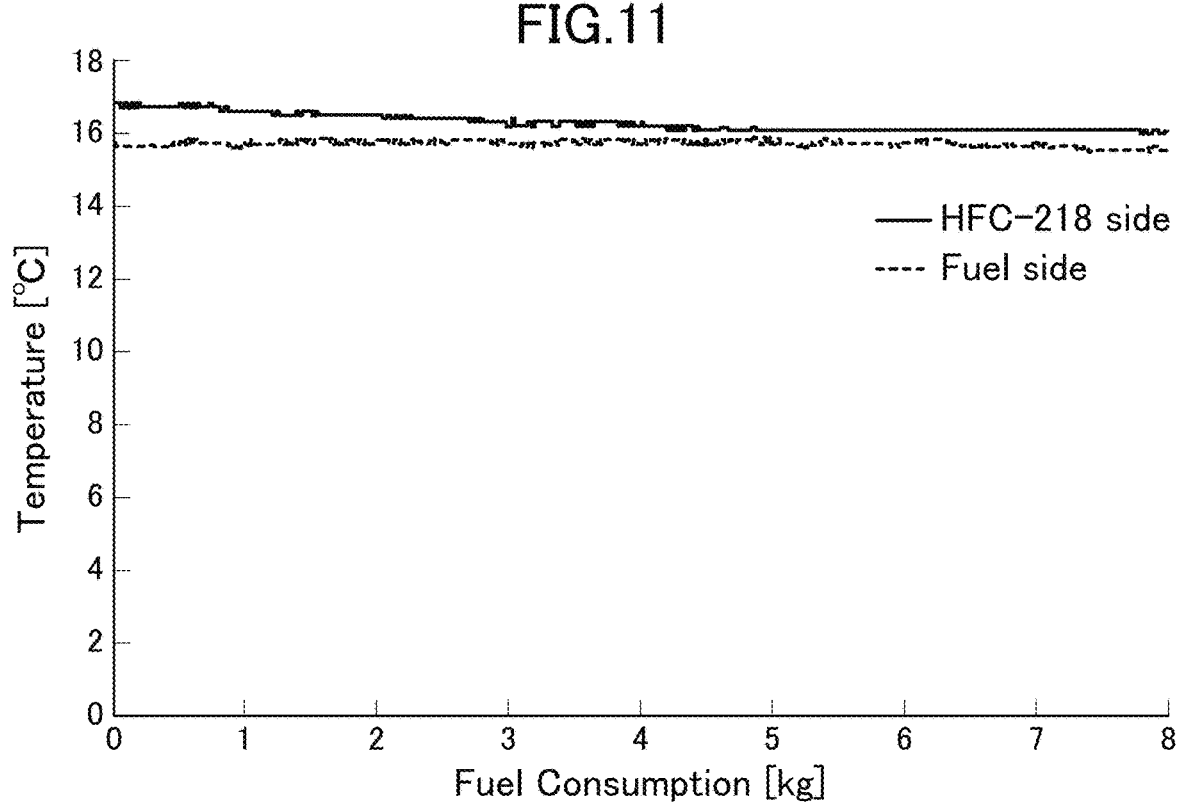
FIG. 11 is a graph depicting a temperature measurement result in Test 1.

A temperature measurement result of Test 1 is presented in FIG. 11. Although, on both the HFC-218 and fuel sides, the tank surface temperature is slightly lowered along with the jet operation, the temperature decrease is 1° C. or less even after a continuous jet operation having a fuel consumption of 8 kg. Although the tank is thermally insulated with respect to the outside, as mentioned above, the magnitude of the temperature decrease presented in FIG. 11 is significantly small, as compared to case where it is assumed that HFC-218 undergoes adiabatic expansion. This is probably because along with expansion of HFC-218, heat flows from the dummy fuel having relatively large heat capacity to HFC-218 through the diaphragm. In Tests 2 and 3, the temperature decrease caused by the jet operation is significantly small, and HFC-218 can be deemed to approximately undergo isothermal expansion, during a continuous jet operation in a configuration where a sufficient amount of HFC-218 is filled.

Figure 12:
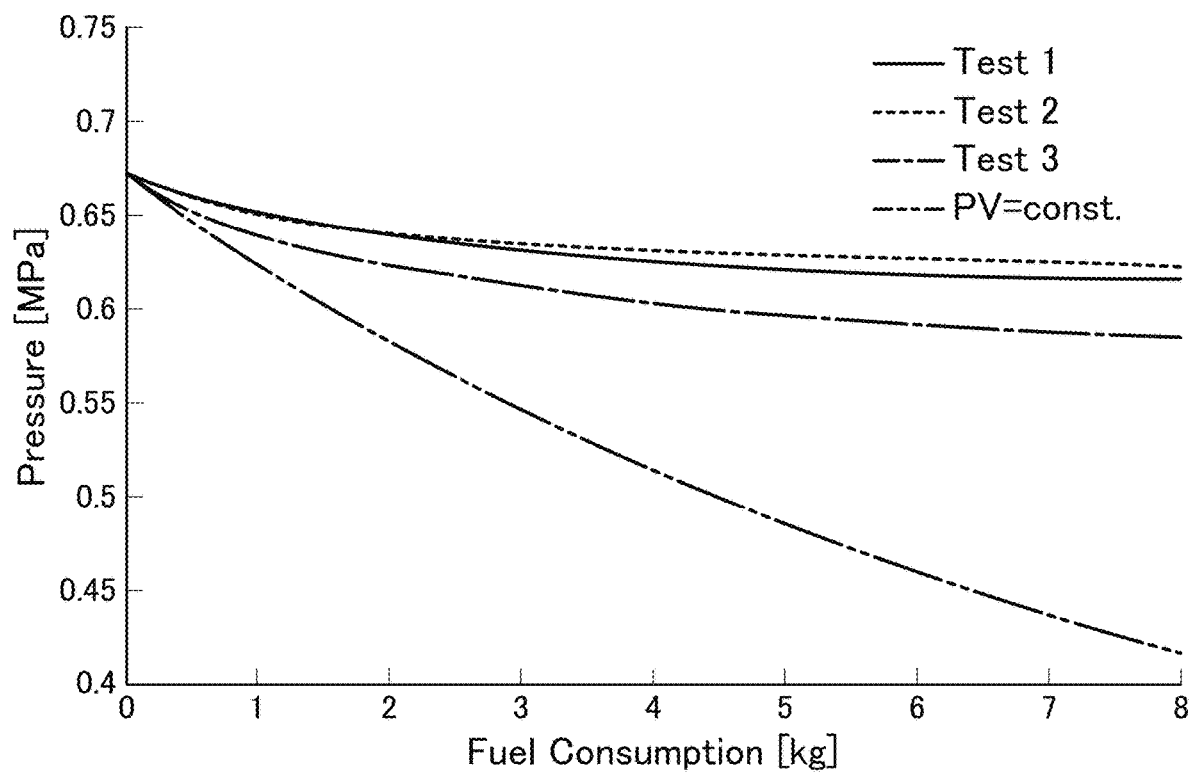
FIG. 12 is a graph depicting pressure measurement results in Tests 1 to 3.

Next, pressure measurement results of Tests 1 to 3 are presented in FIG. 12. In FIG. 12, an isothermal expansion curve (Boyle's law, PV=const.) of ideal gas created by setting an initial point to conform to the initial pressure of the tank is additionally plotted. Supposing that HFC-218 is always kept in a vapor-liquid equilibrium state, the pressure must become constant. However, a vaporization of a liquid phase actually fails to catch up with a reduction in internal pressure, and thereby the pressure is lowered in all of the results. The pressure decrease becomes larger as the initial flow rate becomes higher. However, as compared to the isothermal expansion curve, the pressure decrease is significantly small, in all of the results. This shows that it is possible to perform a jet operation while approximately maintain the internal pressure of the tank.

Next, a pressure measurement result of Test 4 is presented in FIG. 13. In FIG. 13, an isothermal expansion curve (Boyle's law, PV=const.) created by setting a final point to conform to a final pressure of the tank is additionally plotted. As presented in FIG. 13, a slope of a pressure decrease of HFC-218 becomes larger around a fuel consumption of 10 kg. After this point, the pressure curve of Test 4 becomes closer to the isothermal expansion curve. This is probably because the liquid phase of HFC-218 is run out (is fully vaporized) around this point. Further, even before the run-out of the liquid phase, the slope of the pressure decrease of Test 4 becomes evidently large, as compared to Tests 1 to 3. This is probably because, in Test 4, the filling amount of HFC-218 is small, and a surface area of the liquid phase of HFC-218 is small, as compared to Tests 1 to 3, so that the vaporization rate becomes lower.

Last of all, a pressure measurement result of Test 5 is presented in FIG. 14, in combination with the result of Test 4. In Test 5, nitrogen is encapsulated in the tank, so that the internal pressure is higher at the time of start of a jet operation by an amount corresponding to a partial pressure of the nitrogen. Further, in Test 5, irrespective of the fact that the filling amount of HFC-218 is equal to that of Test 4, the liquid phase run-out point as found in the pressure change in Test 4 is not observed. This is probably because the nitrogen provides an increased total internal pressure of the tank, and the increased total internal pressure suppresses vaporization of HFC-218.

An outline of the above embodiments can be described as follows.

In order to solve the above technical problem, the present invention provides a jet system (first jet system) comprising: a storage section for storing therein a jet substance and a pressurizing substance in such a manner that a pressure can be transmitted therebetween; a jet flow creation section for creating a jet flow using the jet substance pressurized by the pressurizing substance and discharged from the storage section; a jet substance supply section for supplying the jet substance discharged from the storage section to the jet flow creation section; and a jet port for jetting a jet flow, wherein the jet system is configured to eject the jet flow, while at least partially restoring an internal pressure of the storage section lowered along with the discharge of the jet substance, based on vaporization of at least a part of the pressurizing substance in the storage section.

In the first jet system, even when the internal pressure of the storage section is lowered along with the discharge of the jet substance such as liquid fuel or oxidizer, from the storage section such as a fuel tank or an oxidizer tank, the internal pressure of the storage section can be restored based on vaporization of the pressurizing substance also stored in the storage section, such as liquefied gas. This makes it possible to perform the pressure regulation without using any high-pressure gas supply subsystem. In a pulsed jet used, for example, during attitude control for a spacecraft, it is possible to fully restore the internal pressure of the storage section (to a vapor pressure of the liquefied gas corresponding to an internal temperature of the storage section), based on vaporization of at least a part of the liquefied gas within a period from a certain jet to a subsequent jet. (In the case where the liquefied gas is entirely vaporized before reaching the vapor pressure, the restoration is only partially achieved.) Even in a continuous jet used, for example, during orbit control, the internal pressure of the storage section is at least partially restored based on vaporization of the liquefied gas occurring along with jet operation.

The first jet system may be configured such that the storage section is divided into a jet substance-side region and a pressurizing substance-side region by a separation member provided inside the storage section, in such a manner as to enable a pressure to be transmitted between the jet substance-side region and the pressurizing substance-side region through the separation member. As the separation member, it is possible to use a diaphragm, a bladder or the like made of a deformable rubber, metal or the like.

The first jet system may be configured such that the jet substance has a heat capacity greater than a heat capacity of the pressurizing substance. When the jet substance and the pressurizing substance are selected in this manner, heat flows from the jet substance into the pressurizing substance, during jet operation. This makes it possible to suppress reduction in temperature of the pressurizing substance and reduction in pressure of the pressurizing substance in a vapor state.

The first jet system may be configured such that the storage section stores therein a pressurizing gas different from the pressurizing substance, in the pressurizing substance-side region of the storage section. By using the additional pressurizing gas, it becomes possible to increase a total internal pressure of the pressurizing substance-side region of the storage section, i.e., reduce an amount of pressurizing substance to be used for obtaining a desired total internal pressure.

The first jet system may further comprise a temperature control section for controlling an internal temperature of the storage section. Through temperature control, it becomes possible to control a vapor pressure of the pressurizing substance in the storage section, and thus control an amount of the jet substance to be discharged from the storage section.

The present invention also provides a jet system (second jet system) comprising: a first storage section for storing therein a first jet substance and a first pressurizing substance in such a manner that a pressure can be transmitted therebetween; a second storage section for storing therein a second jet substance and a second pressurizing substance in such a manner that a pressure can be transmitted therebetween; a jet flow creation section for creating a jet flow using the first jet substance pressurized by the first pressurizing substance and discharged from the first storage section and the second jet substance pressurized by the second pressurizing substance and discharged from the second storage section; a jet substance supply section for supplying the first jet substance discharged from the first storage section and the second jet substance discharged from the second storage section to the jet flow creation section; and a jet port for jetting the jet flow, wherein the jet system is configured to eject the jet flow, while at least partially restoring an internal pressure of each of the first and second storage sections lowered along with the discharge of a corresponding one of the first and second jet substances, based on vaporization of at least a part of a corresponding one of the first and second pressurizing substances in a corresponding one of the first and second storage sections. As with the first jet system, the second jet system can eject a jet flow while restoring the internal pressures of the first and second storage sections, based on respective vaporizations of the first and second pressurizing substances.

In one example of the second jet system, the first jet substance is a fuel, and the first jet substance is an oxidizer, wherein the jet flow creation section may be configured to mix the fuel and the oxidizer together to thereby combust the fuel to create the jet flow. In addition to such a scheme, the second jet system may be configured based on any other suitable scheme (including a scheme which will be developed in the future) of creating a jet flow using arbitrary two jet substances through an arbitrary process.

The second jet system may also be configured such that the first storage section is divided into a first jet substance-side region and a first pressurizing substance-side region by a first separation member provided inside the first storage section, in such a manner as to enable a pressure to be transmitted between the first jet substance-side region and the first pressurizing substance-side region through the first separation member, and the second storage section is divided into a second jet substance-side region and a second pressurizing substance-side region by a second separation member provided inside the second storage section, in such a manner as to enable a pressure to be transmitted between the second jet substance-side region and the second pressurizing substance-side region through the seconds separation member.

The second jet system may also be configured such that the first jet substance has a heat capacity greater than a heat capacity of the first pressurizing substance, and the second jet substance has a heat capacity greater than a heat capacity of the second pressurizing substance.

The second jet system may be configured such that the first storage section stores therein a first pressurizing gas different from the first pressurizing substance, in the first pressurizing substance-side region of the first storage section, and the second storage section stores therein a second pressurizing gas different from the second pressurizing substance, in the second pressurizing substance-side region of the second storage section.

The second jet system may further comprise a first temperature control section for controlling an internal temperature of the first storage section, and a second temperature control section for controlling an internal temperature of the second storage section.

Further, the present invention provides a jet system (third jet system) comprising: 1st to n-th storage sections each defined as a k-th storage section containing a k-th jet substance and a k-th pressurizing substance in such a manner that a pressure can be transmitted therebetween, where k is an integer selected from 1 to n (where n is an integer of 2 or more) and is assigned in ascending order to each of the 1st to n-th storage sections; a jet flow creation section for creating a jet flow using the 1st to n-th jet substances pressurized, respectively, by the 1st to n-th pressurizing substances and discharged, respectively, from the 1st to n-th storage sections; and a jet substance supply section for supplying the 1st to n-th jet substances discharged, respectively, from the 1st to n-th storage sections, to the jet flow creation section; and a jet port for jetting the jet flow, wherein the jet system is configured to eject the jet flow, while at least partially restoring an internal pressure of each of the 1st to n-th storage sections lowered along with the discharge of a corresponding one of the 1st to n-th jet substances, based on vaporization of at least a part of a corresponding one of the 1st to n-th pressurizing substances in a corresponding one of the 1st to n-th storage sections.

INDUSTRIAL APPLICABILITY

The jet system of the present invention is usable as any type of jet system for jetting a jet flow, including a propulsion system for a small spacecraft.

LIST OF REFERENCE SIGNS

1: jet system
2, 2A, 2B, 2C: storage container
3, 3A, 3B, 3C: diaphragm
4, 18, 10: liquid fuel
5: foam metal
6, 6A, 6B, 6C: liquefied gas (liquid)
7, 7A, 7B, 7C: liquefied gas (vapor)
8, 8A, 8B, 8C: heater
9, 9A, 9B, 9C: fill and drain valve
9D-1 to 9D-3: test port
10, 10A, 10B, 10C: filter
11, 11A, 11B, 11C: latch-type solenoid valve
12A-1 to 12C-2: propellant valves
13: reaction chamber
14: jet port
15A to 15C: pressure sensor
16: bladder
17: oxidizer

The invention claimed is:

1. A jet system operating method comprising:
providing a storage section and storing therein a jet substance and a pressurizing substance that is a different substance than the jet substance, wherein the jet substance and the pressurizing substance are mixed with each other;
creating, by a jet flow creation section, a jet flow using the jet substance stored in the storage section; and
jetting, by a jet port, the jet flow created by the jet flow creation section,
wherein the pressurizing substance is capable of being at least partially vaporized in the storage section to thereby pressurize an inside of the storage section.

2. The jet system operating method as recited in claim 1, wherein a heat capacity of the jet substance is greater than a heat capacity of the pressurizing substance.

3. The jet system operating method as recited in claim 1, wherein the storage section stores therein a second pressurizing substance for pressurizing the inside of the storage section.

4. The jet system operating method as recited in claim 1, further comprising:
controlling, by a temperature control section, an internal temperature of the storage section to cause the pressurizing substance to be vaporized.

5. A jet system operating method comprising:
providing a first storage section and storing therein a first jet substance and a first pressurizing substance that is a different substance than the first jet substance, wherein the first jet substance and the first pressurizing substance are mixed with each other;
providing a second storage section and storing therein a second jet substance and a second pressurizing substance that is a different substance than the second jet substance, wherein the second jet substance and the second pressurizing substance are mixed with each other;
creating, by a jet flow creation section, a jet flow using the first jet substance stored in the first storage section and the second jet substance stored in the second storage section; and
jetting, by a jet port, the jet flow created by the jet flow creation section, wherein each of the first pressurizing substance and the second pressurizing substance is capable of being at least partially vaporized in a corresponding one of the first storage section and the second storage section to thereby pressurize a corresponding one of an inside of the first storage section and an inside of the second storage section.

6. The jet system operating method as recited in claim 5, wherein the first jet substance is a fuel, and the second jet substance is an oxidizer, and wherein the jet flow creation section is configured to mix the fuel and the oxidizer together to thereby combust the fuel to create the jet flow.

7. The jet system operating method as recited in claim 5, wherein
a heat capacity of the first jet substance is greater than a heat capacity of the first pressurizing substance, and
a heat capacity of the second jet substance is greater than a heat capacity of the second pressurizing substance.

8. The jet system operating method as recited in claim 5, wherein the first storage section stores therein a third pressurizing substance for pressurizing the inside of the first storage section, and the second storage section stores therein a fourth pressurizing substance for pressurizing the inside of the second storage section.

9. The jet system operating method as recited in claim 5, which comprises:

controlling, by a first temperature control section, an internal temperature of the first storage section to cause the first pressurizing substance to be vaporized, and controlling, by a second temperature control section, an internal temperature of the second storage section to vaporize the second pressurizing substance.

10. A jet system operating method comprising:

preparing 1st to n-th storage sections, each of the $1^{st}$ to n-th storage sections defined as a k-th storage section containing a k-th jet substance and a k-th pressurizing substance that is a different substance than the k-th jet substance, where k is an integer selected from 1 to n (where n is an integer of 2 or more) and is assigned in ascending order to each of the 1st to n-th storage sections, wherein the k-th jet substance and the k-th pressurizing substance are mixed with each other;

creating, by a jet flow creation section, a jet flow using each respective k-th jet substance stored in each of the 1st to n-th storage sections; and jetting, by a jet port, the jet flow created by the jet flow creation section, and wherein each k-th pressurizing substance is capable of being at least partially vaporized in a corresponding one of the 1st to n-th storage sections to thereby pressurize an inside of the corresponding one of the 1st to n-th storage sections.

* * * * *